United States Patent
Almarza Castillo et al.

(10) Patent No.: US 10,376,824 B2
(45) Date of Patent: Aug. 13, 2019

(54) MECHANICAL SYSTEM TO CAPTURE AND TRANSFORM CONTAMINANT GASES, AND METHOD TO PURIFY AIR

(71) Applicant: ECOLOGICAL WORLD FOR LIFE S.A.S., Norte de Santander (CO)

(72) Inventors: Jorge Luis Almarza Castillo, San Cristóbal (VE); Jhosmer Anderson Cuadros Andrade, San Cristóbal (VE); Chucheng Zhou, San Cristóbal (VE); Ernesto Enrique Larrazabal Mogollon, San Cristóbal (VE)

(73) Assignee: ECOLOGICAL WORLD FOR LIFE S.A.S., Cucuta, Norte De Santander (CO)

( * ) Notice: Subject to any disclaimer, the term of this patent is extended or adjusted under 35 U.S.C. 154(b) by 69 days.

(21) Appl. No.: 15/164,008

(22) Filed: May 25, 2016

(65) Prior Publication Data
US 2017/0274309 A1 Sep. 28, 2017

(30) Foreign Application Priority Data

Mar. 22, 2016 (CO) .................................. 16 072111

(51) Int. Cl.
| | | |
|---|---|---|
| *B01D 46/00* | (2006.01) | |
| *B01D 46/30* | (2006.01) | |
| *B01D 53/56* | (2006.01) | |
| *B01D 53/62* | (2006.01) | |
| *B01D 53/82* | (2006.01) | |

(52) U.S. Cl.
CPC ..... *B01D 46/0027* (2013.01); *B01D 46/0013* (2013.01); *B01D 46/0023* (2013.01); *B01D 46/30* (2013.01); *B01D 53/565* (2013.01); *B01D 53/62* (2013.01); *B01D 53/82* (2013.01); *B01D 2251/304* (2013.01); *B01D 2251/306* (2013.01); *B01D 2251/604* (2013.01); *B01D 2251/70* (2013.01); *B01D 2251/80* (2013.01); *B01D 2252/602* (2013.01); *B01D 2253/102* (2013.01); *B01D 2253/106* (2013.01); *B01D 2253/112* (2013.01); *B01D 2253/1124* (2013.01); *B01D 2253/20* (2013.01); *B01D 2253/304* (2013.01); *B01D 2257/404* (2013.01); *B01D 2257/502* (2013.01); *B01D 2257/504* (2013.01); *B01D 2258/012* (2013.01); *B01D 2258/0283* (2013.01); *B01D 2258/06* (2013.01); *Y02A 50/2341* (2018.01); *Y02C 10/04* (2013.01)

(58) Field of Classification Search
CPC B01D 46/0027; B01D 46/0013; B01D 53/82; B01D 53/565; B01D 53/62; B01D 46/30; B01D 46/0023; B01D 2251/304; B01D 2252/602; B01D 2251/80; B01D 2251/70; B01D 2251/604; B01D 2251/306; B01D 2258/012; B01D 2257/502; B01D 2253/304; B01D 2253/112; B01D 2253/106; B01D 2253/102; B01D 2258/06; B01D 2257/504; B01D 2257/404; B01D 2253/20; B01D 2258/0283; B01D 2253/1124; Y02A 50/2341; Y02C 10/04
See application file for complete search history.

(56) References Cited

U.S. PATENT DOCUMENTS

| | | | |
|---|---|---|---|
| 2006/0000357 A1* | 1/2006 | Michael | B01D 53/04 95/273 |
| 2010/0087027 A1* | 4/2010 | Wieting | H01L 31/0749 438/61 |
| 2010/0203327 A1* | 8/2010 | Inoue | C23C 22/46 428/341 |
| 2011/0288184 A1* | 11/2011 | Nardo | B01D 53/229 518/702 |
| 2012/0174793 A1 | 7/2012 | Eisenberger | |
| 2014/0245920 A1* | 9/2014 | Govindappa | B01D 46/002 105/96 |
| 2014/0370576 A1 | 12/2014 | Wright | |
| 2015/0283501 A1 | 10/2015 | Eisenberger | |

FOREIGN PATENT DOCUMENTS

| | | |
|---|---|---|
| AU | 2012241388 | 11/2010 |
| EP | 2409753 | 1/2012 |

\* cited by examiner

*Primary Examiner* — Renee Claytor
*Assistant Examiner* — Susan E. Fernandez
(74) *Attorney, Agent, or Firm* — Neifeld IP Law, PC

(57) ABSTRACT

Disclosed herein is a system for purifying air; for the capture of solid residues (soot), and the transformation of $CO_x$ and $NO_x$ (and even methane) present in contaminated air generated by industrial combustion. The purifying air system comprises an air entrance (c); a first module (A), made up of mechanical filters; a second module (B), downwards from the first module (A), and it corresponds to a series of small reactors with molecular converters (nucleophile chemical agents) to capture and transform carbon oxides ($CO_x$) and nitrogen oxides ($NO_x$); and an exit for decontaminated air (D).

13 Claims, 3 Drawing Sheets

MECHANICAL SYSTEM TO CAPTURE AND TRANSFORM CONTAMINANT GASES, AND METHOD TO PURIFY AIR

CROSS REFERENCE TO RELATED APPLICATIONS

This application claims the benefit of CO application no. 16 072111, filed Mar. 22, 2016; and the preceding application is incorporated herein by reference.

TECHNICAL FIELD

This invention is related to the technical field of air purification, specifically the capture of solid residues (soot), and the transformation of $CO_x$ and $NO_x$ (and even methane) present in contaminated air generated by industrial combustion.

PREVIOUS STATE OF THE ART

Technologies developed to purify contaminated air are basically based on reactors that capture $CO_2$ as of absorbents consisting of amines, metallic catalyzers (gold, platinum and manganese, among other metals), watery hydroxides, separation membranes with micropores, and ionic interchangers, among others.

Climate Engineering, based in Calgary (Canada), captured carbon dioxide using a liquid solution of sodium hydroxide, an industrial technique known for a long time, and worked on the decontamination problem for several years until it gave up in 2012.

Peter Eisenberger and collaborators developed and patented a reactor that captures carbon dioxide with the help of absorbent amines, and afterwards they separate it through physical processes in order to sell it. In spite of the fact that the reactions due to the capture of $CO_2$ with amines have been known for a long time, engineers have already used amines to clean $CO_2$ from the centrals' combustion gases, whose temperature is about 70° C. To be able to separate the $CO_2$ in the amines and "regenerate" them reactions at about some 120° C. were lacking. By comparison, Eisenberger calculated that his system would operate at approximately 85° C., so less total energy would be required. He would use vapor, which is relatively cheaper, for both objectives. The vapor would heat up the surface, separating the $CO_2$ from the amines to pick it up at the same time it was raising it up from the surface.

The company Global Research Technologies and Klaus Lackner, from Columbia University, has developed a device anchored to a square meter of land surface ("like a tree") that suctions air from the atmosphere and generates two flows, one of clean air and the other of $CO_2$; clean air is returned to the atmosphere whereas $CO_2$ is sent to the capturing equipment.

Another set of technological developments consists of devices containing precious metals (platinum and gold) and others less costly such as copper and manganese developed by researchers from Universidad Nacional de San Luis (UNSL).

Existing reactors and highly expensive not only because of the price of catalyzers (gold, platinum, palladium, titanium, and others) but also due to the whole complexity of the mechanical, electronic, and control mechanisms for the automation to be used so that they can be functional. Besides, these systems need a high consumption of energy to preserve very high or low temperatures or pressures required to carry out the capture and separation processes of the said components. On the other hand, most of them are geared to capturing one part of $CO_2$, and do not solve the problem of the industrial dust, methane, or $NO_x$, limiting them in functionality. In addition, their reactors lack versatility, with limited application—for example in the auto industry, airlines, and kitchens, among others.

BRIEF DESCRIPTION OF THE INVENTION

This invention provides a mechanical system and a method with the capacity to capture and transform not only $CO_x$ and $NO_x$ (even methane) but in addition it can catch solid particles (soot) generated in the organic combustion, and which cause grave damage to the respiratory system. The system involved in this invention is, consequently, versatile and adaptable equipment for the environmental decontamination at different (critical and non-critical) levels regardless of the contamination source. These characteristics make it a reactor with a diverse industrial application.

This invention's system consists of an integral device made up of modules with specific reactivities that have the capacity to convert contaminated air from an industrial source into clean air, free from $CO_x$, $NO_x$ and toxic soot. In addition, this equipment is a versatile device that adapts itself to the contamination source of any industrial system going from a kitchen, transport vehicles, space cabins, up to a thermoelectric plant or any other place where combustion or gas liberation from greenhouse effects (GHE) takes place.

This invention's system consists of a metallic system of modules placed as follows: 1) a module for the capture of particles from solids freed in industrial combustions; 2) a module made up of sub-modules with molecular (chemical) converters with the capacity to transform carbon dioxide ($CO_2$), carbon monoxide (CO) and, additionally, nitrogen oxides ($NO_x$).

This invention's device works without solvents, neither organic ones (amines) nor organic (aqueous/watery); it works only with solid systems acting as absorbents participating in the transformation processes. This device does not work either with external energy for the capture of gases or for the separation of the products obtained which reduces its operating cost, and makes it more environment-friendly. Due to the specific set up of the system's elements, it does not require gadgets to generate and control mechanical movements nor pressure or temperature changes. In addition, neither ionic interchange resins are required to capture $CO_2$ or foam-based elements or cells. This equipment does not require electronic devices that imply automation or control, so its construction and implementation is highly simple.

Thus, this invention provides a mechanical system made up of material, porous and reactive matrixes (sand, organic carbon, aluminum-silicates, hydroxides as very fine dust, and other composites) within a determinate sequence that will be described below. Its filters must be changed at certain specific times, depending on the degree of the emission contained in the industrial system of interest.

This whole description comprises the device developed for the purification of contaminated air, and which can be adapted to industrial systems such as thermoelectric plants, refineries, as well as kitchens and vehicles, and industries working with hydrocarbon combustion, and transportation, among others.

Another purpose of this invention is to provide a method basically consisting of three sequential steps that are important for the capture and transformation of the gases of interest. The first step is the capture of the fine dust from industrial combustion. The second and third ones deal with the capture and transformation of gases from greenhouse effects (GHE).

DETAILED DESCRIPTION OF THE INVENTION

Figure 1:
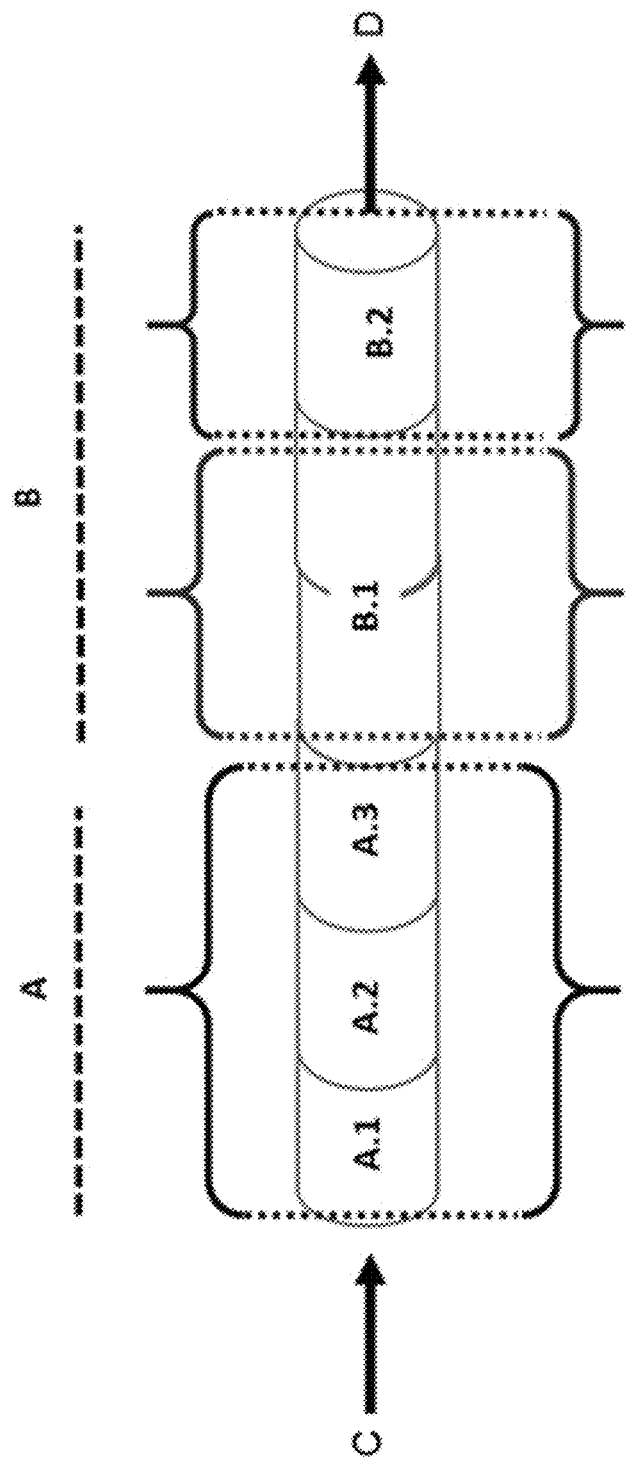
FIG. 1: Contaminated air purifying device.

This invention's system is made up of two modules. The first modules (A), located next to the entrance of the contaminated air (C), is made up of mechanical filters, separated by 30 to 80 micron sieve stainless steel micro-meshes, with sand previously treated with solar light to make it humidity free; organic carbon filters, and added aluminum-silicate filters.

The second module (B), downwards from the first module (A), is a series of small reactors, filters with 30-40 micron meshes, with molecular converters (chemical nucleophile agents) whose function is to capture and transform carbon oxides ($CO_x$) and nitrogen oxides ($NO_x$).

It is important to add that the second module (B), filters with 30-40 micron meshes, is divided into two parts. The first part is a chemical reactor (B.1) that contains solid metallic hydroxides (NaOH and KOH) macerated up to a fine 200 micron dust; the purpose of this section of the reactor is to capture and transform carbon dioxides ($CO_x$). The second one is a chemical reactor (B.2) that contains a mixture of solid ketones (5.40%), guanidines (5-40%) and solid organic sulfur compounds such as thiourea (5-40%) macerated to a similar size; the purpose of this part of the reactor is to capture and transform nitrogen oxides ($NO_x$).

Under a preferential development, the invention has, in addition, an accessory filter with a cocktail of enzymes immersed into particulate material that contains multi-enzyme complexes such as Pyruvate carboxylase, Propionic Carboxylase, Carbonic Anhydrase, Rubisco and other carboxylases that are present for the transformation of $CO_2$ into organic and inorganic products. This filter is located between the first chemical reactor (B.1) and the second chemical reactor (B.2).

The modules are connected among themselves with bridle-type unions and adjusted through the support material, thus allowing for a safe union that is easy to dismantle.

Depending on the industrial need and the reactor's design, additional modifications can be incorporated into it, such as a pair of electrode plates that generate a variable field of sparks of voltaic arches thus allowing the transformation of methane and the oxidation of carbon particles into gaseous COx; the said plates will be installed on an isolating surface to the electric current. As a preferential development, the said pair of electrode plates may correspond to conducting metallic meshes fed by a voltage differential provided by an electric coil; they will be installed in the device on materials resistant to electric conductivity. Besides, with pressure valves at the entrance or exist of decontaminated air (D) and/or among the modules, two regulate air pressure in each section. In industrial systems where the temperatures are well under 300° C., this invention's device is elaborated with very resistant materials such as carbon fiber, which makes it more stable, resistant, and light. Lastly, in very high-flow systems gas and liquid traps are used to separate liquids and gases different from the air found within the current going through the system.

The overall principle to purify air comprises the following steps:
1. Separation of solid particles (soot) emitted in an organic combustion, and which are trapped by sand filters, organic carbon, and aluminum-silicates, in order to avoid the contamination of the posterior reactive filters which may, at the same time, diminish their reactivity. Both negative aspects may affect and complicate, in addition, the processes related to the separation and cleaning of the posterior capture devices.
2. Capture of carbon oxides (CO, $CO_2$) of the device containing solid metallic hydroxides.
3. Optionally, transformation of $CO_2$ into organic and inorganic products by means of the accessory filter with a cocktail of enzymes immersed into particulate material.
4. Capture of nitrogen oxides (NOx) of the module containing the mixture of ketones, guanidines, and organic sulfur compounds in dust form.

Experimental Evaluations

To determine the device's efficiency the following parameters were evaluated (variation in the amount of contaminants) making use of the following methodology
1. Study flow variation. CO and $CO_2$ flow variations were studied (5, 40, 50, 70, 80, and 120 ml/min), provided independently in separate experiments, as of highly pure commercial sources during consecutive lapses from 10 minutes up to one and a half hour (1 h, 30 min). Measurements were made with an AGILENT ADM2000 fluxmeter. For statistical validity and greater trustworthiness, these experiments were—under controlled conditions (flow, temperature, pressure and humidity)—repeated in the lab 1200 times.
    On the other hand, experiments were carried out (controls or witnesses) under the same conditions but with inert materials within the reactor to ensure that the effect observed was the result of the reactivity of the materials used. In addition, Δp measurements were taken (pressure variations) considering in and out pressure of the device, with the help of a portable combustion analyzing equipment (Bacharach-$PCA^3$).
2. Study of the amounts (ppm) of $CO_x$ coming out of the exhaust pipes of commercial vehicles. These variables were taken with the help of a portable combustion analyzing equipment (Bacharach-$PCA^3$) and a $CO_2$ portable measurer (AMPROBE $CO_2$-100) in the presence and absence of the purifying device developed. These experiments were repeated at consecutive lapses of 10 seconds per an hour and a half, with an average of 10 repetitions.
    On the other hand, experiments were carried out (control or witnesses) under the same conditions but with inert materials within the reactor to ensure that the effect observed was the outcome of the reactivity of the filters used. The pressure variations in the reactor's in and out sections coupled to the exhaust pipe.

3. Analysis of the changes in the amounts (ppm) of $NO_x$. The $NO_x$ sources studied were the amounts coming out of the exhaust pipes of the commercial vehicles, which were measured with the help of a portable combustion analyzing equipment (Bacharach-$PCA^3$) in the presence or absence of the purifying device developed. No studies were done of high-purity commercial $NO_x$ since they were not available in the market. In addition, 10 repetitions of the same experiment were carried out with their respective controls in consecutive lapses of 60 seconds up to 5 minutes.

The commercial vehicle used for these tests was a 2009 family car with a 1.6 L gasoline engine, 4 cylinders. The flow used for these tests was 720 L/min.

4. Capacity to trap the combustion fine dust of the capture filters. A.1, A. 2 and A. 3 filters were incorporated into the exhaust pipe of a commercial vehicle (a 1995 van), which did not have the catalyzer, and allowed it to liberate much fine contaminant dust through the exhaust pipe. After 5 minutes, the device's internal components were taken out, and a photographic record was made, which would evidence the capture capacity of the filter module.

Results and Discussions

Variation of the amounts of Carbon Oxides ($CO_x$)

Atmospheric increases of Cox are the major cause (≥70%) of global warming and, as a result, of the increase of storm activity, the poles' ice caps melting, and the climate's erratic behavior, which in addition is the cause of many a natural disaster.

Figure 2:
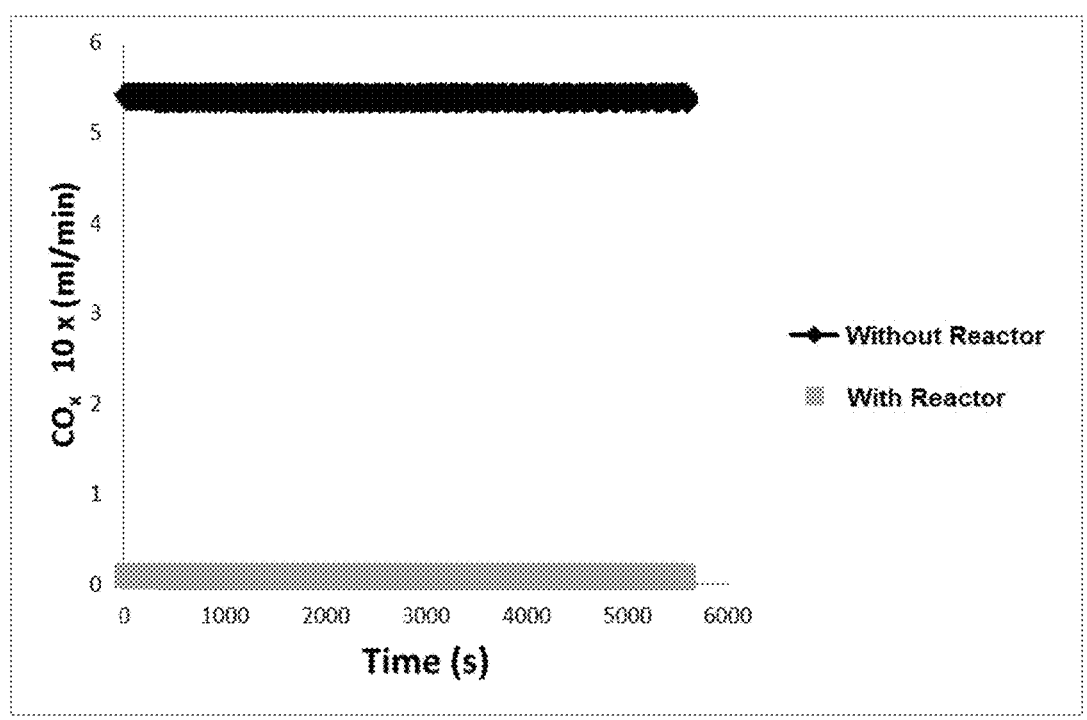
FIG. 2: Experimental flow comparison (ml/min) of $CO_x$ with and without this invention's system.

The results obtained, related to $CO_x$ flow and amounts which were measured with or without the reactor developed can be noticed in FIG. 2, which illustrates the effect of the reactor developed on the $CO_x$ flow (ml/min) in function of time. The $CO_x$ ($CO$ and $CO_2$) source flow was of high purity. In FIG. 2 it can be seen that the amounts of $CO_x$ fall in few seconds from their maximum percent amount down to a minimum fluctuating between 2 to 5% (of the maximum total) regardless of the $CO_x$ source and of the amounts made to go through the device developed (5, 40, 50, 70, 80 y 120 ml/min); that is, both for the high-purity commercial sources ($CO_x$) as well as for the source from commercial vehicles, the efficiency of the capture of the carbon oxides was within a 95-98% range. It is worthwhile to notice that no substantial changes were observed in the pressure variations, which suggests that the results observed are the consequence of the device's reactivity or the capture capacity and not of the obstruction of its filters or of an experimental artifact.

Variation of $NO_x$ Amounts $NO_x$ are the second most contaminating group (~10%) of the GHGs (Green House Gases), and which are difficult to capture once they are found in the atmosphere. With the experiments made on the gas emission tube or the exhaust pipe of the vehicle analyzed, in spite of the fluctuations generated as the result of the vehicle's energetic demands, into which the device developed was adapted, it was possible to see that in the presence of the system developed, the latter is capable of capturing up to 80% of $NO_x$-type gases (see FIG. 3), which is an evidence—once again—of the capacity that the ordering of the filters has, as well as their reactivity within the reactor to capture the higher contaminants of $NO_x$ organic combustion ($NO_x$ and $CO_x$). Besides, the reactor's versatility and simplicity permit to adapt it to any industrial systems and, in this specific case, to the vehicles' exhaust pipe.

Figure 3:
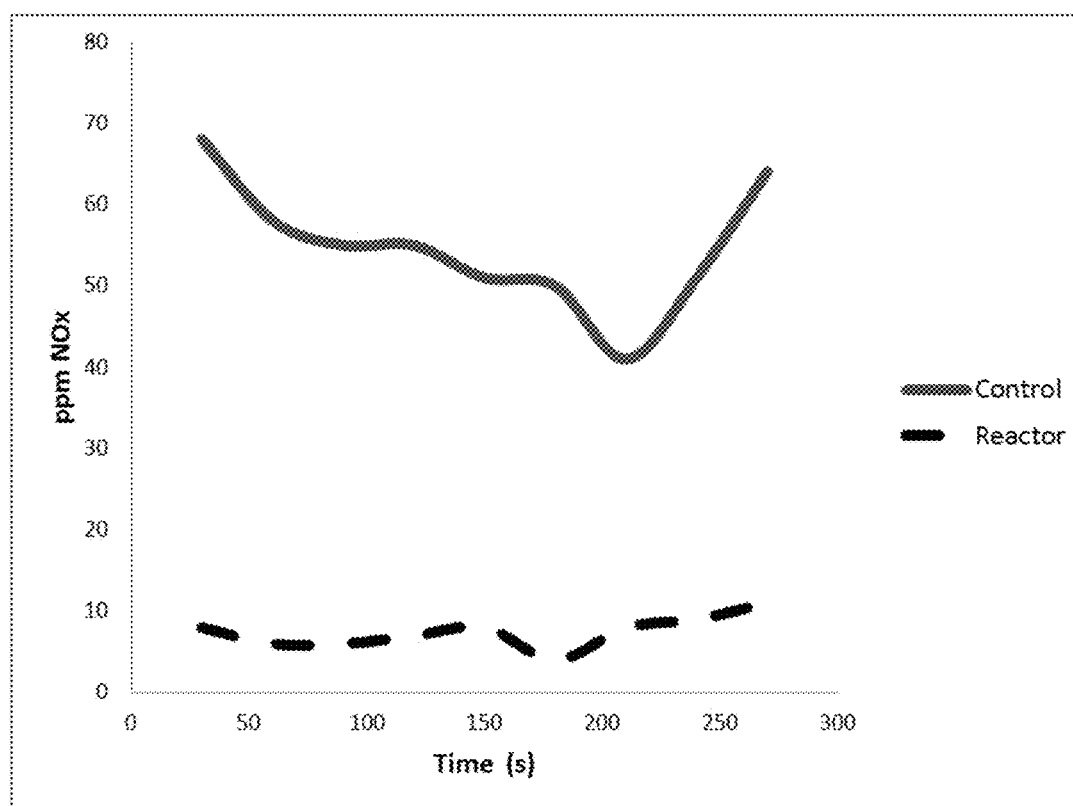
FIG. 3: Effect of the developed reactor on the amount of $NO_x$ (ppm) as a function of the time spent in a commercial vehicle.

FIG. 3 illustrates the effect of the reactor developed on the amounts of $NO_x$ (ppm) in function of time. The $NO_x$ flow source comes from the commercial vehicle described before. Scientific Reasoning Applied.

The reactive or mechanical-quantic nature of the electrophiles lies on the Emptied Low Energy Molecular Orbital (OMBED for its Spanish acronym) of the carbon oxides (Cox) and nitrogen (NOx) in gaseous state, and it will be the same regardless of the organic combustion liberating them. In addition, the same will happen with the nucleophile's reactivity which, at the same time, is modulated by the energy of the Higher Occupation Molecular Orbital (OMOA for its Spanish acronym). Consequently, taking into account these basic premises (OMOA/OMBED interaction), it can be inferred that regardless of the industrial source from where the GHGs come, if they are made to go through the device developed, the reaction between them will be spontaneous and inevitable; that is, that whenever an organic combustion takes place, the equipment we have developed will be able to prevent GHE gases from being liberated into the atmosphere. Nonetheless, the shape and dimensions of the device are not standard, so they must be adapted depending on the industrial need. This points out to the wide application that the reactor developed has, at an industrial level, to solve contamination problems generated by land, maritime, and air transportation, thermoelectric plants, fires, and the industry, among other contaminating sources.

Capture of Solid Residues (Soot) of Industrial Contamination

Figure 4:
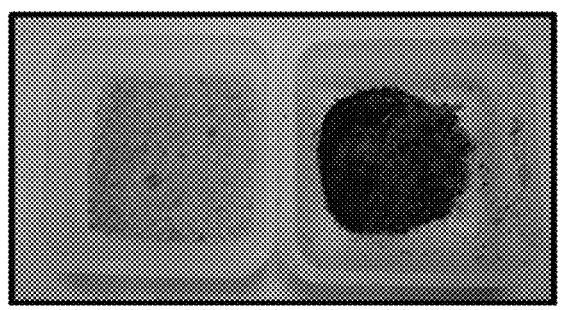
FIG. 4: Component of the capture filters for the fine dust before being subject to capture tests in the exhaust of a commercial vehicle (left) and after being subject to experimental tests (right).

In FIG. 4, the filter module's capacity (capture of fine dust) can be observed for the rapid capture of solid residues from the combustion of the diesel vehicle used to evaluate their easy capture. This is important due to the fact that such particles are responsible for grave respiratory diseases that are common in industrialized countries where regulations are rather passive.

All this experimental evidence showed suggests that the device developed does work and, additionally, that it is a promissory system to eliminate to a great extent noxious effects generated by carbon oxides (carbon dioxide and monoxide), nitrogen oxides, main generators of the greenhouse effect, regardless of the emission source (commercial or industrial). On the other hand, the system—object of this application, has the capacity to trap solid residues from combustion, which are noxious for the health. In the same order of ideas, the said reactor is significantly simpler than previous state of the art devices; it has multiple functions; it is not costly; and it has the capacity to be adapted into any industrial device that generates any organic combustion.

The invention claimed is:

1. An air purifying system for catching solid particles generated in organic combustions that comprises:
    an air entrance (C);
    a first module (A), comprising mechanical filters comprising sand, mechanical filters comprising organic carbon, and mechanical filters comprising aluminum-silicate aggregates, which are separated by stainless steel micro meshes and have the sieve-mesh size within a 30-80 micron range;
    a second module (B), downwards from the first module (A), which is divided into two parts:
        a first chemical sub-module (B.1) that comprises filters with meshes of a 30-40 micron range; and
        a second chemical sub-module (B.2)
    wherein both parts comprise molecular converters to capture and transform carbon oxides (COx) and nitrogen oxides (NOx);

an accessory filter located between the first chemical sub-module (B.1) and the second chemical sub-module (B.2), which has a cocktail of enzymes immersed in particulate material; and an exit for decontaminated air (D).

2. The system of claim 1, where the sand of the filters of module (A) is pre-treated with solar light to free it from humidity.

3. The system of claim 1, where the first chemical sub-module (B.1) contains solid and macerated metallic hydroxides, and the second chemical sub-module (B.2) is made up of a mixture of ketones, guanidines and solid macerated organic sulfur compounds.

4. The system of claim 3, where solid and macerated metallic hydroxides are selected among NaOH, KOH, or a mixture of the same.

5. The system of claim 3, where solid and macerated metallic hydroxides have a particle size of 200 micron; and are contained in the filters with meshes of a 30-40 micron range.

6. The system of claim 3, where macerated organic sulfur compounds comprise thiourea.

7. The system of claim 6, where plates are installed on an isolating surface to electric current.

8. The system of claim 1 wherein the cocktail of enzymes of the accessory filter immersed in particulate material contains multi-enzyme complexes comprising Pyruvate Carboxylase, Propionic Carboxylase, Carbonic Anhydrase Rubisco, other carboxylases, and a mixture of the same.

9. The system of claim 1, where the modules are associated among themselves by bridle-type unions and are adjusted by support material.

10. The system of claim 1, further comprising pairs of electrode plates that generate a variable field of sparks or voltaic arches to transform methane and the oxidation of carbon particles into gaseous COx, which will be captured by solid and macerated metallic hydroxides.

11. The system of claim 10, where the pairs of electrode plates are metallic meshes conducting electricity and are provided with an electric coil.

12. The system of claim 1, where the system is made of carbon fiber to provide it with the characteristics of resistance and low weight.

13. The system of claim 1, which does not work with external energy for the capture of gases or for the separation of the products obtained.

* * * * *